US010284896B2

(12) United States Patent
Lu

(10) Patent No.: US 10,284,896 B2
(45) Date of Patent: May 7, 2019

(54) SMART TV CONTROLLING METHOD AND SMART TV THEREOF

(71) Applicants: HISENSE ELECTRIC CO., LTD., Qingdao (CN); HISENSE USA CORPORATION, Suwanee, GA (US); HISENSE INTERNATIONAL CO., LTD., Qingdao (CN)

(72) Inventor: Yutai Lu, Qingdao (CN)

(73) Assignees: Hisense Electric Co., Ltd., Qingdao (CN); Hisense USA Corporation, Suwanee, GA (US); Hisense International Co., Ltd., Qingdao (CN)

( * ) Notice: Subject to any disclaimer, the term of this patent is extended or adjusted under 35 U.S.C. 154(b) by 0 days.

(21) Appl. No.: 15/394,767

(22) Filed: Dec. 29, 2016

(65) Prior Publication Data
US 2017/0289607 A1   Oct. 5, 2017

(30) Foreign Application Priority Data

Apr. 1, 2016   (CN) .......................... 2016 1 0206253

(51) Int. Cl.
*H04N 21/422* (2011.01)
*H04N 5/44* (2011.01)

(52) U.S. Cl.
CPC ..... *H04N 21/42218* (2013.01); *H04N 5/4403* (2013.01); *H04N 21/42215* (2013.01);
(Continued)

(58) Field of Classification Search
CPC ........... H04N 21/42218; H04N 5/4403; H04N 2005/4421; H04N 21/42226; H04N 2005/4435; H04N 21/42215
See application file for complete search history.

(56) References Cited

U.S. PATENT DOCUMENTS 5,184,315 A * 2/1993 Lapeyre ..................... B41J 5/10
                                                    708/145
7,429,932 B1 * 9/2008 Newell .................. G08C 17/00
                                                    340/12.24
(Continued)

FOREIGN PATENT DOCUMENTS

CN          101001333 A         7/2007
CN          103648005 A         3/2014
(Continued)

OTHER PUBLICATIONS

First Office Action for Chinese Application No. 201610206253.3 dated Mar. 28, 2018 (8 pp).

*Primary Examiner* — Chenea Davis
*Assistant Examiner* — Chenea Smith
(74) *Attorney, Agent, or Firm* — Brinks Gilson & Lione

(57) ABSTRACT

Disclosed are a smart TV controlling method and a smart TV thereof, the method including: determining currently running UI; obtaining key controlling policy for the currently running UI according to pre-stored mapping between UI and key controlling policy, the key controlling policy indicating adjustment for UI controlling keys; generating controlling instruction according to received key information sent from remote controlling device and key controlling policy for the currently running UI; and sending the controlling instruction to the currently running UI for the UI to perform operation associated with the controlling instruction. The key information sent from the remote controlling device is adaptable to different UIs according to different key controlling policies of different UIs, allowing operations associated with key information be adapted to the requirements of different UIs, so that appropriate adjustments are made to the current running UI according to the user's needs.

14 Claims, 13 Drawing Sheets

(52) U.S. Cl.
CPC ............... *H04N 21/42226* (2013.01); *H04N 2005/4421* (2013.01); *H04N 2005/4435* (2013.01)

(56) References Cited

U.S. PATENT DOCUMENTS

| | | | |
|---|---|---|---|
| 7,589,642 B1* | 9/2009 | Mui | G08C 17/00 340/12.3 |
| 2007/0160205 A1* | 7/2007 | Choe | H04N 5/44543 380/200 |
| 2011/0301722 A1* | 12/2011 | Sato | G08C 17/02 700/17 |
| 2014/0150048 A1* | 5/2014 | Oh | H04N 21/4345 725/132 |
| 2015/0179061 A1* | 6/2015 | Kim | G08C 23/04 348/734 |
| 2015/0208013 A1* | 7/2015 | Friedrich | H04N 21/42215 348/734 |

FOREIGN PATENT DOCUMENTS

| | | |
|---|---|---|
| CN | 104823455 A | 8/2015 |
| CN | 104992538 A | 10/2015 |

\* cited by examiner

SMART TV CONTROLLING METHOD AND SMART TV THEREOF

CROSS-REFERENCE TO RELATED APPLICATIONS

This application claims priority to Chinese Patent Application No. 201610206253.3, filed on Apr. 1, 2016 and entitled "SMART TV CONTROLLING METHOD AND SMART TV THEREOF", the content of which is incorporated by reference herein in its entirety.

TECHNICAL FIELD

The present application relates to the field of smart TV, and more particularly, to a smart TV controlling method and a smart TV thereof.

BACKGROUND

With the development of smart technology, smart TV has become increasingly popular in daily life. In the development process of smart TV's user interface (UI), to realize response to remote control keys is an important part of smart TV control.

In related art, the key-based method for controlling smart TV generally involves a remote controlling device sending key information according to detected user key operation. After the smart TV receives the key information from the remote controlling device, the operating system or the bottom layer of the smart TV will send the key information directly to the UI. After the UI receives the key information sent from the operating system or the bottom layer of the smart TV, an operation will be made, for example, volume adjustment, interface display and so on according to the key information.

Yet in related art, a smart TV has a variety of applications, and thus a variety of different types of UIs. Thus, different UIs have to take operations according to the same key information.

SUMMARY

The present application provides a smart TV controlling method and a smart TV thereof.

The first aspect of the present application provides a smart TV controlling method, including:
  determining a currently running UI;
  obtaining a key controlling policy for the currently running UI according to a pre-stored mapping between each UI and each key controlling policy, the key controlling policy indicating an adjustment for UI controlling keys;
  generating a controlling instruction according to received key information sent from a remote controlling device and the key controlling policy associated with the currently running UI; and
  sending the controlling instruction to the currently running UI to enable the currently running UI to perform an operation associated with the controlling instruction.

Another aspect of the present application provides a smart TV, including:
  a determining module, configured to determine a currently running UI;
  an obtaining module, configured to obtain a key controlling policy associated with the currently running UI according to a pre-stored mapping between each UI and each key controlling policy, the key controlling policy indicating an adjustment for UI controlling keys;
  a receiving module, configured to receive key information sent from a remote controlling device;
  a processing module, configured to process the key information according to the key controlling policy associated with the currently running UI to generate a controlling instruction; and
  a sending module, configured to send the controlling instruction to the currently running UI, so that the currently running UI performs an operation associated with the controlling instruction.

Yet another aspect of the present application provides a smart TV, including: a memory storing instructions; a processor coupled with the memory and configured to execute the instructions stored in the memory, and the processor is configured to:
  determine a currently running UI;
  obtain a key controlling policy for the currently running UI according to a pre-stored mapping between each UI and each key controlling policy, the key controlling policy indicating an adjustment for UI controlling keys;
  generate a controlling instruction according to received key information sent from a remote controlling device and the key controlling policy for the currently running UI; and
  send the controlling instruction to the currently running UI to enable the currently running UI to perform an operation associated with the controlling instruction.

DETAILED DESCRIPTION

In order to make the purposes, the technical solutions and the advantages of the present application more apparent, a clear and comprehensive description will be given to the technical solution of the present application with reference to the accompanying drawings of the embodiments of this application.

Figure 1:
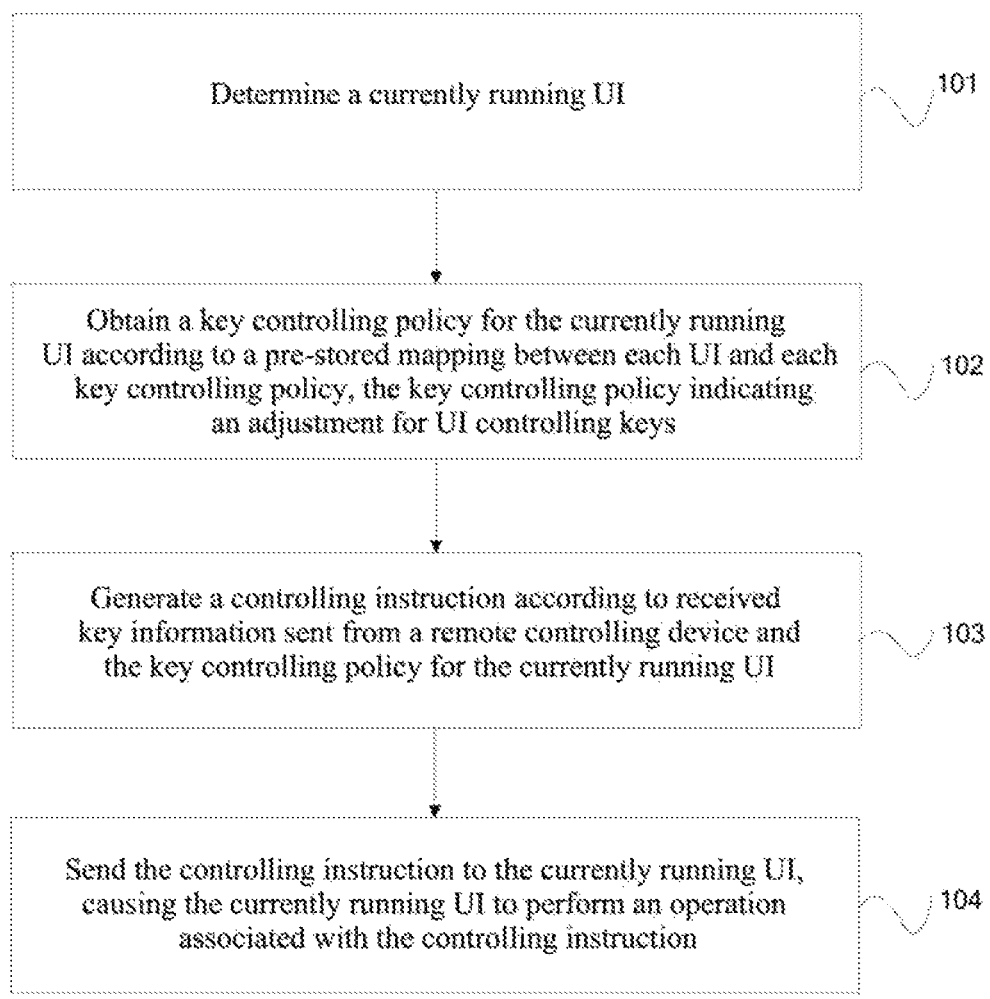
FIG. 1 is a flowchart illustrating a smart TV controlling method provided in some embodiments of this application.

FIG. 1 is a flowchart illustrating a smart TV controlling method provided in some embodiments of this application. As illustrated in FIG. 1, the method includes:

S101: determine a currently running UI.

Illustratively, a smart TV includes a plurality of applications, each of which has an UI. Thus, the smart TV has a plurality of UIs.

A key service module is included in the smart TV. The key service module may be a software module or a hardware module. During the operation of the smart TV, the key service module of the smart TV firstly determines the currently running UI, so that the UI identifier of the currently running UI in the smart TV can be obtained. In this case, the UI identifier may be marked by the Chinese name, English name, numbers, characters and/or the like associated with each UI.

For example, a normally operating smart TV has a currently running UI. This UI may be identified, so that its UI identifier A is obtained.

S102: obtain a key controlling policy for the currently running UI according to a pre-stored mapping between each UI and each key controlling policy, the key controlling policy indicating an adjustment for UI controlling keys.

Illustratively, the mapping between an UI and a key controlling policy is pre-stored in the key service module of the smart TV, and may be proactively transmitted to the key service module by each UI. The key controlling policy indicates the adjustment manner for the controlling keys of the UI.

For example, the UI of the first application of the smart TV has its own key controlling policy, and can send the UI identifier and the key controlling policy for the first application to the key service module for storing. The UI of the second application of the smart TV has its own key controlling policy, and can send the UI identifier and the key controlling policy for the second application to the key service module for storing.

The key service module can obtain the key controlling policy for the currently running UI according to the pre-stored mapping between each UI and its key controlling policy. Since the key service module in S101 has determined the UI identifier for the currently running UI, and the UI identifier of the UI is associated with the key controlling policy, the key controlling policy associated with the UI identifier of the currently running UI can be found in the mapping according to the UI identifier of the currently running UI.

S103: generate a controlling instruction according to received key information sent from a remote controlling device and the key controlling policy for the currently running UI.

Illustratively, a user triggers a remote controlling device to send key information which may include a key identifier. The operating system or bottom layer of a smart TV receives the key information sent from the remote controlling device, and sends the same to the key service module, so that the key service module receives the key information sent from the remote controlling device.

For example, the user triggers the remote controlling device by pressing down the numeric key "1", so that the remote controlling device can send the key information including the number "1" to the operating system or the bottom layer of the smart TV, which forwards the key information including the number "1" to the key service module.

The key service module can process the received key information according to the key controlling policy associated with the UI identifier of the currently running UI determined in S102, so that the controlling instruction may be generated.

For example, the key service module determines the key controlling policy for currently running UI, and the remote controlling device sends the keypress triggering information to the key service module through the operating system or the bottom layer, and the interval of the triggering information of these two keypresses is 200 milliseconds (ms). According to the key controlling policy for the currently running UI, the key service module decides that the interval of the triggering information of these two keypresses needs to be adjusted to 50 ms. Thus, the key service module adjusts and processes the triggering information of the keypress to generate the controlling instruction which indicates that, for the currently running UI, the interval time of triggering information of the keypresses is 50 milliseconds.

S104: send the controlling instruction to the currently running UI to enable the currently running UI to perform an operation associated with the controlling instruction.

Illustratively, the key service module sends the generated controlling instruction to the currently running UI according to the UI identifier of the currently running UI, so that the currently running UI performs an operation associated with the controlling instruction accordingly.

For example, the key service module adjusts and processes the triggering information of the keypress, and adjusts the interval of the triggering information of keypress from 200 ms to 50 ms to generate the controlling instruction. The controlling instruction indicates that for the currently running UI, the interval of the triggering information of keypress is 50 ms. The key service module sends the controlling instruction to the currently running UI so that the currently running UI receives the keypress triggering information with an interval of 50 ms between adjacent keypresses. Then, the currently running UI makes adjustments and performs operation, such as adjusting the volume of the currently running UI, so that the volume is increased by a predefined value within 50 milliseconds, where the predefined value can be one.

According to the pre-stored mapping between an UI and its key controlling policy, the embodiment of the present application determines the key controlling policy for the currently running UI in the smart TV, so that the controlling keys can be adjusted and handled in response to the key information according to the received key information sent from the remote controlling device through the operating system or the bottom layer and the key controlling policy for the currently running UI, instead of the operating and controlling policy for responding to keypress from the remote controlling device and fixed by a program in the smart TV operating system or the bottom layer. In effect, the key information sent from the remote controlling device can be adapted to different UIs according to the different key controlling policies of different UIs, so that the operations associated with the key information can be adapted to the requirements of different UIs. The controlling instruction is generated after adjusting and handling the key control in response to the key information according to the key controlling policy for the currently running UI, and is then sent to the currently running UI so that the currently running UI can perform the operation associated with the controlling instruction. Since the processed key information conforms to the requirements of the currently running UI, the currently running UI can perform the operation adapted thereto according to the controlling instruction, so that appropriate adjustments are made to the current running UI for fulfilling the needs of the user. Meanwhile, the key processing procedure is separated from the UI layers, so that the module dedicated to key handling can be removed without negatively impacting the UIs and system operations of the smart TV, which weakens the dependency between the key handling module and other modules, thereby improving the portability of the key handling module.

Figure 2:
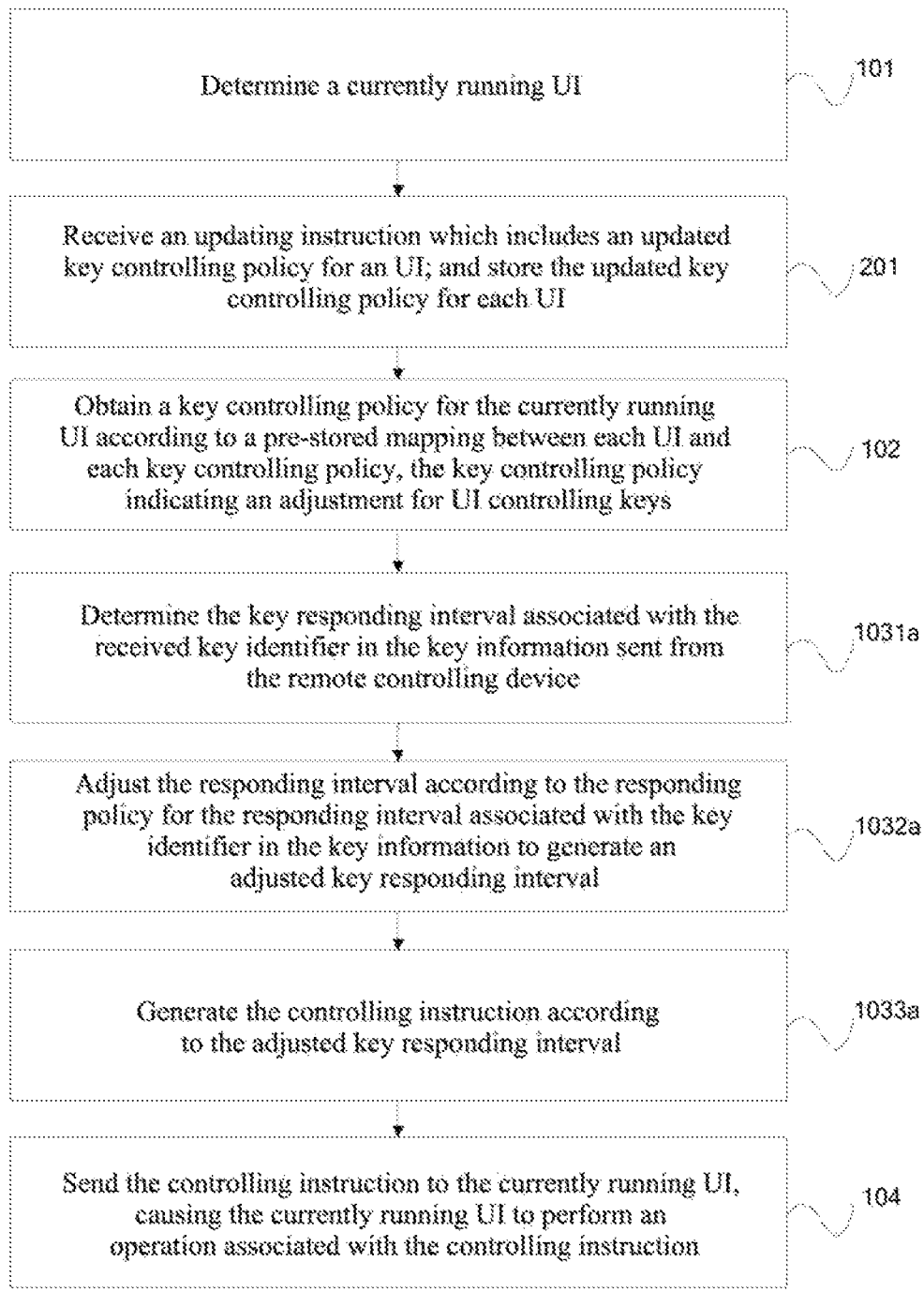
FIG. 2 is a flowchart illustrating a smart TV controlling method provided in some embodiments of this application.

FIG. 2 is a flowchart illustrating a smart TV controlling method provided in some embodiments of this application. As shown in FIG. 2, an implementation is provided, which, before S102, further includes:

S201: receive an updating instruction which includes an updated key controlling policy for an UI; and store the updated key controlling policy for each UI.

Illustratively, the key service module of an smart TV may receive an updating instruction sent from the operating system or the bottom layer of the smart TV. The updating instruction indicates that a key controlling policies for one or more UIs are to be changed, and includes the key controlling policies for the UIs after the changing. The key service module of the smart TV can store the updated key controlling policy for each UI, facilitating the key service module to obtain, in S102, the key controlling policy for the currently running UI according to the pre-stored mapping between the UI and the key controlling policy.

The user can make changes to the key controlling policy in the operating system or the bottom layer of smart TV, enabling the user to make needed adjustments to the key controlling policy for each UI of the smart TV, thereby making each UI of the smart TV to meet the user's needs for TV watching and using.

For example, a key service module of a smart TV receives an updating instruction that includes an updated key controlling policy for the UI of a first application. The updated key controlling policy indicates that the numeric key "1" sent from the remote controlling device is associated with increasing the volume for the UI. The key service module of the smart TV stores the information in the updating instruction. Hence when the UI of the first application is running, the remote controlling device sends the key information of the numeric key "1" through the operating system or the bottom layer, enabling the key service module of the smart TV to discover that the key information of the numeric key "1" is for increasing the volume according to the updated key controlling policy for the UI of the first application, so that the key service module generates a controlling instruction for increasing the volume. The key service module sends the controlling instruction to the UI of the first application which is currently running to enable the UI of the first application to increase the volume according to the controlling instruction.

The key information in the embodiment of the present application includes: a key identifier. The key controlling policy for the currently running UI includes a responding policy for a responding interval associated with a key identifier.

In this case, S103 may include:

S1031a: determine the key responding interval associated with the received key identifier in the key information sent from the remote controlling device.

Illustratively, the key controlling policy obtained in S102 associated with the currently running UI includes a responding policy for a responding interval associated with a key identifier. The key information received in S103 includes a key identifier. Different key identifiers can be associated with different responding policies. That is, for different key identifiers, the adjustments to the responding intervals are different.

For example, the numeric key "1" has a key identifier 1 which is associated with an adjustment in which the responding interval of the numeric key "1" is increased. The numeric key "2" has a key identifier 2 which is associated with an adjustment in which the responding interval of the numeric key "2" is decreased.

The key service module of the smart TV receives the key information sent from the remote controlling device through the operating system or the bottom layer, where the key information includes the key identifier. The key service module firstly needs to determine the key responding interval associated with the key identifier in the key information. At this point, the key responding interval for each key identifier has been fixed by the operating system or the bottom layer of the smart TV through a program, and hence the key service module can acquire the responding interval from the operating system or the bottom layer of the smart TV.

For example, for keydown, keyup, keypress and other events, the operating system or the bottom layer of the smart TV has configured that: the key responding interval associated with the keydown event of key identifier to be 100 microseconds (μs), the key responding interval associated with the keyup event of key identifier to be 150 μs, and the key responding interval associated with the keypress event of key identifier to be 200 μs.

S1032a: adjust the responding interval according to the responding policy for the responding interval associated with the key identifier in the key information to generate an adjusted key responding interval.

Illustratively, having determined a responding policy of the responding intervals associated with the key identifier in the key information, the key service module performs adjustments to the key responding interval associated with the key identifier in the key information according to the responding policy, and then obtains the adjusted key responding interval.

For example, when a UI is running, the user initiates an UI interface for increasing the volume by sending key information for increasing the volume to the operating system or the bottom layer of the smart TV through the remote controlling device to trigger a keypress event, where the key information has a key identifier B. The key identifier B for the current UI has been set to have a key responding interval of 200 μs in the operating system or the bottom layer. That is, a computing operation is performed every 200 μs. After the key service module obtains the key responding interval of 200 μs, it adjusts the key responding interval from 200 μs to 50 μs according to the responding policy for responding intervals associated with the key identifier B, which indicates that the responding interval of keypress event is determined to be 50 μs. That is, a keypress event is triggered every 50 μs.

S1033a: generate the controlling instruction according to the adjusted key responding interval.

Illustratively, the key service module generates a controlling instruction according to the adjusted key responding interval. Thus, the key service module sends the controlling instruction to the currently running UI, so that the currently running UI performs the operations and adjustments in response to the controlling instruction.

For example, the adjusted key responding interval is 50 μs for the volume-up key of key identifier B, hence the currently running UI increases the volume thereof every 50 μs by a certain amount according to the keypress event with a responding interval of 50 μS.

For another example, the volume increasing and decreasing mode can be configured for different UIs or keys when the volume is adjusted, and hence the following adjusting modes can be provided: steady volume increasing mode, fast volume increasing mode, fast-slow volume increasing mode, accelerate-decelerate volume increasing mode, or other volume increasing mode following customized curves. In the customized curve mode, the user can make needed configuration for the volume increasing and decreasing mode. Thus, the intervals of the keypress event can conform with a first curve for the steady volume increasing mode. As for the fast volume increasing mode, the interval of the keypress event conforms with a second curve. As for the fast-slow volume increasing mode, the interval of the keypress event conforms with a third curve. As for the accelerate-decelerate volume increasing mode, the interval of the keypress event conforms with a fourth curve. As for the customized curve mode, the interval of the keypress event conforms with a fifth curve defined by the user. For example, having obtained the key responding interval of 200 μs, the key service module may adjusts the key responding interval 200 μs following the first curve according to the responding policy for responding intervals associated with the key identifier B, and thus the adjusted key responding interval can be determined.

Moreover, in the embodiment of the present application, a standard keypress can be used in the handling of the keypress event of the UI through programs, without the need for any special treatment. In the process of adjusting by program, only the key requirements need to be modified in the form of data, which avoids modifying and compiling the program, thereby increasing the efficiency in development and debugging.

Figure 3:
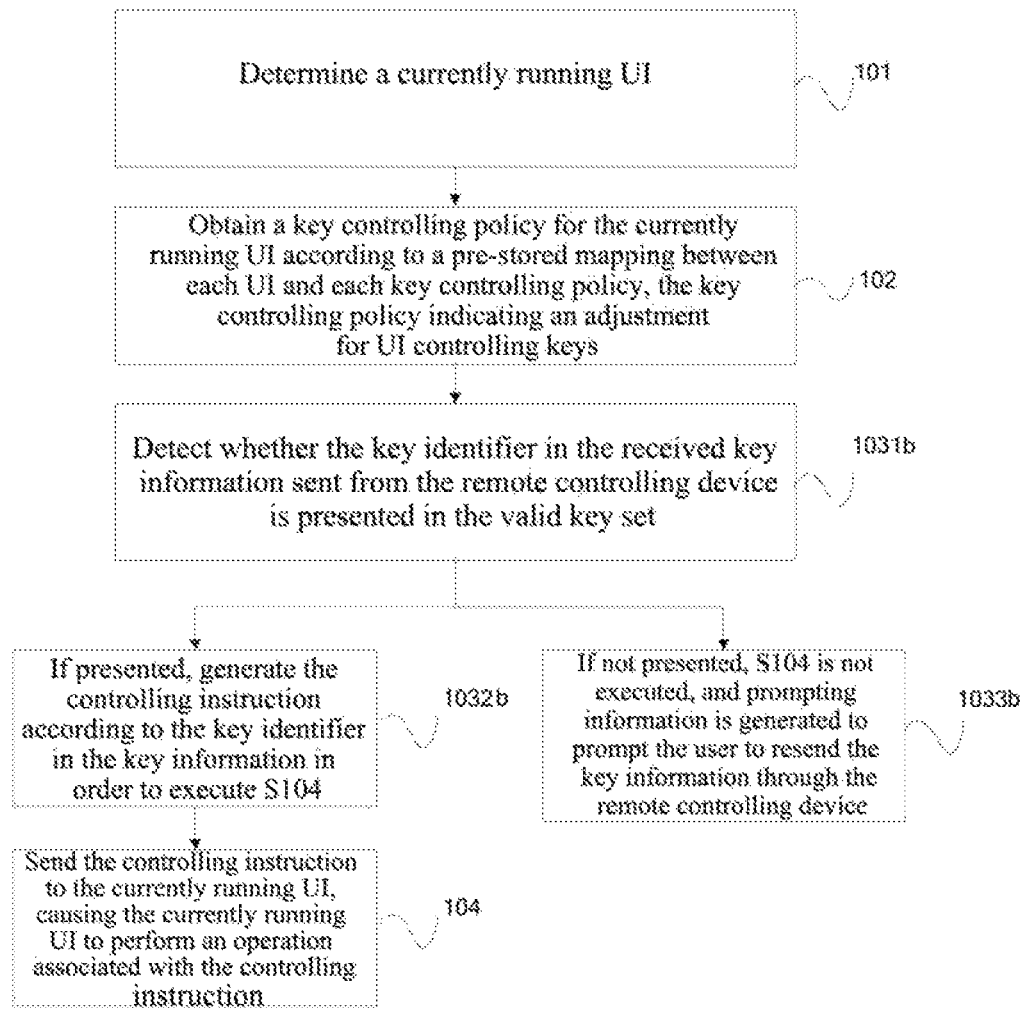
FIG. 3 is a flowchart illustrating a smart TV controlling method provided in some embodiments of this application.

FIG. 3 is a flowchart illustrating a smart TV controlling method provided in some embodiments of this application. As shown in FIG. 3, an implementation is provided, where the key information includes: a key identifier. The key controlling policy for the currently running UI includes: a valid key set. The valid key set includes the key identifier for at least one valid key.

In this case, S103 may include:

S1031b: detect whether the key identifier in the received key information sent from the remote controlling device is presented in the valid key set.

Illustratively, the key controlling policy obtained at S102 in association with the currently running UI includes the valid key set that includes a key identifier of at least one valid key. The key information received in S103 includes a key identifier.

The key service module of the smart TV pre-stores the valid key set for the currently running UI. The key service module of the smart TV firstly detects whether the key identifier in the key information is present in the valid key set of the currently running UI.

For example, the key service module pre-stores a valid key set for the currently running UI: key identifier 1, key identifier 2, key identifier 3 and key identifier 4. Or, for example, the key service module pre-stores a valid key set for the currently running UI: key identifier A, key identifier B, key identifier C and key identifier D.

S1032b: if presented, generate the controlling instruction according to the key identifier in the key information in order to execute S104.

Illustratively, if the key service module determines that the key identifier in the key information is presented in the valid key set of the currently running UI, the key service module can generate a controlling instruction according to the key identifier in the key information, and then send the controlling instruction to the currently running UI to enable the currently running UI to perform the operation associated with the controlling instruction.

For example, after the key service module has determined the currently running UI and the user triggers the numeric key "1" on the remote controlling device, the key service module receives the key identifier 1 of the numeric key "1" sent from the remote controlling device through the operating system or the bottom layer. Since the key service module pre-stores the valid key set of the currently running UI, and the valid key set of the currently running UI includes the key identifier 1, key identifier 2, key identifier 3 and key identifier 4, the key service module can determine that identifier 1 is presented in the valid key set of the currently running UI.

S1033b: if not presented, S104 is not executed, and prompting information is generated to prompt the user to resend the key information through the remote controlling device.

Illustratively, if the key service module determines that the key identifier in the key information is not presented in the valid key set of the currently running UI, the key service module may generate prompting information to prompt the user to resend the key information through the remote controlling device. In this case, the prompting information can be voice or text information.

For example, after the key service module has determined the currently running UI and the user triggers the numeric key "5" on the remote controlling device. At this time, the key service module receives the key identifier 5 of the numeric key "5" sent from the remote controlling device through the operating system or the bottom layer. Since the key service module pre-stores the valid key set of the currently running UI, and the valid key set of the currently running UI includes the key identifier 1, key identifier 2, key identifier 3 and key identifier 4, the key service module can determine that identifier 5 is presented in the valid key set of the currently running UI.

Figure 4:
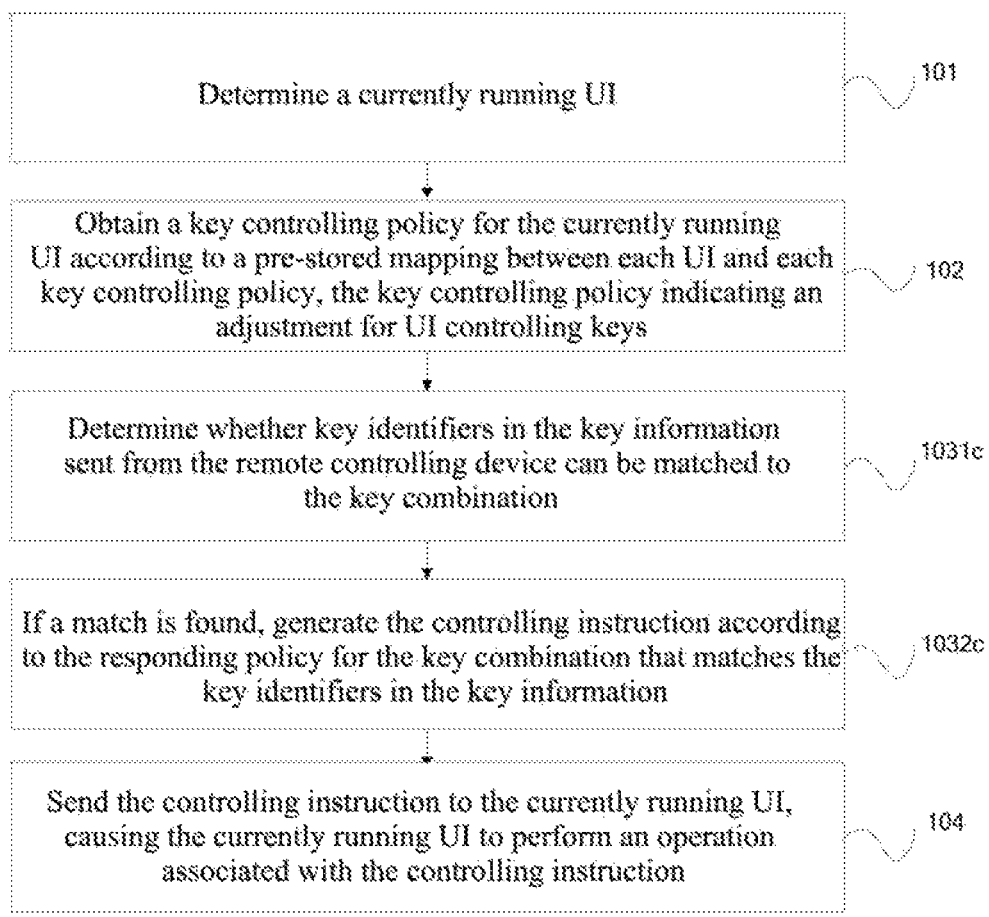
FIG. 4 is a flowchart illustrating a smart TV controlling method provided in some embodiments of this application.

FIG. 4 is a flowchart illustrating a smart TV controlling method provided in some embodiments of this application. As shown in FIG. 4, an implementation is provided, where the key information includes: at least two key identifiers. The key controlling policy for the currently running UI includes: a responding policy for a key combination. In this case, the key combination includes at least two key identifiers.

In this case, S103 may include:

S1031c: determine whether key identifiers in the key information sent from the remote controlling device can be matched to the key combination.

Illustratively, the key controlling policy for the currently running UI obtained at S102 includes a responding policy for each key combination which includes at least two key identifiers. The key information received in S103 includes at least two key identifiers.

At this point, the user simultaneously triggers at least two keys on the remote controlling device, so that the key information sent from the remote controlling device through the operating system of the smart TV or the bottom layer includes at least two key identifiers. Since the key service module of the smart TV pre-stores key combinations for the currently running UI, and each key combination includes at least two key identifiers, the key service module can determine whether the key identifiers in the received key information matches with any one of the key combinations.

For example, the user simultaneously triggers the numeric keys "1", "2" and "3", which have key identifier 1, key identifier 2 and key identifier 3 respectively, on the remote controlling device. The key service module of the smart TV pre-stores key combinations for the currently running UI, including a first, second and third key combination, where the first key combination includes the key identifier 1, 2 and 3, the second key combination includes key identifier 4, 5 and 6, and the third key combination includes key identifier 6, 7 and 8.

S1032c: if a match is found, generate the controlling instruction according to the responding policy for the key combination that matches the key identifiers in the key information.

Illustratively, since the key service module further includes a responding policy for each key combination, if one of the key combinations can be matched to the key identifiers in the received key information, the key service module can generate a controlling instruction in accordance with the responding policy for the key combination that matches the key identifiers in the received key information.

For example, the user simultaneously triggers the numeric keys "1", "2" and "3", which have key identifier 1, key identifier 2 and key identifier 3 respectively, on the remote controlling device. The remote controlling device can send the key information to the key service module through the operating system or the bottom layer of the smart TV, where the key information includes the key identifier 1, the key identifier 2 and the key identifier 3. The key service module of the smart TV pre-stores key combinations for the currently running UI, including a first, second and third key combination, where the first key combination includes the key identifier 1, 2 and 3, the second key combination includes key identifier 4, 5 and 6, and the third key combination includes key identifier 6, 7 and 8. The key service module may find out that the first key combination of the key combinations can be matched with the key identifiers in the key information. Thus, the key service module can generate the controlling instruction according to the responding policy for the first key combination. For example, "key identifier 1, key identifier 2, key identifier 3" combination is associated with the operations for replacing the page of the currently running UI.

Figure 5:
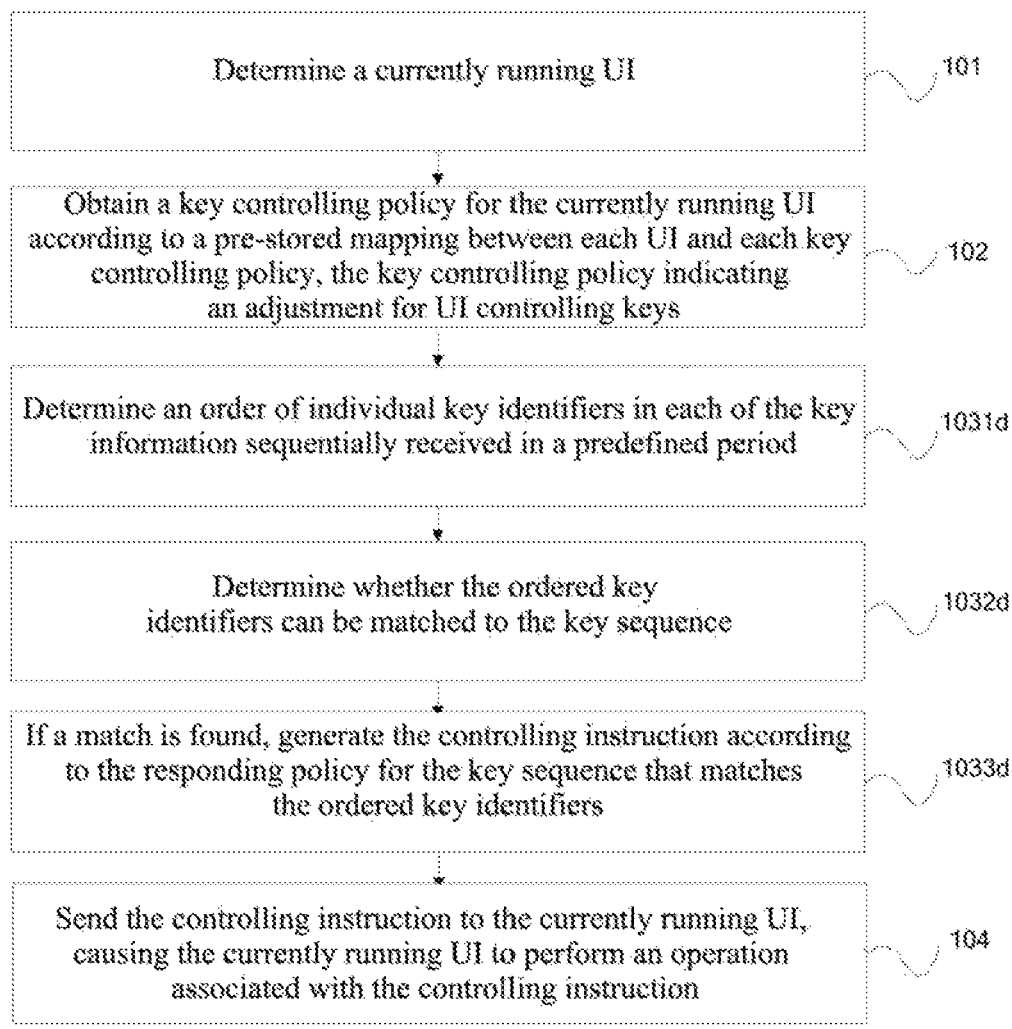
FIG. 5 is a flowchart illustrating a smart TV controlling method provided in some embodiments of this application.

FIG. 5 is a flowchart illustrating a smart TV controlling method provided in some embodiments of this application. As shown in FIG. 5, an implementation is provided, where the key information includes: a key identifier. The key controlling policy for the currently running UI includes: a responding policy for a key sequence. In this case, the key sequence includes at least two key identifiers following a sequential order.

Accordingly, S103 includes:

S1031d: determine an order of individual key identifiers in each of the key information sequentially received in a predefined period;

Illustratively, the key controlling policy for the currently running UI obtained in S102 includes a responding policy for a key sequence. The key sequence includes at least two key identifiers following a sequential order. The key information received in S103 includes a key identifier.

The user triggers a number of keys on the remote controlling device as needed, but this time, the number of keys on the remote controlling device are triggered sequentially in a specific order, so that the remote controlling device sends multiple key information to the key service module of the smart terminal through the operating system or the bottom layer according to the order the user triggers the keys, and each key information includes a key identifier. Furthermore, the key service module can determine the order of individual key identifiers in each of the key information sequentially received in the predefined period.

For example, the user simultaneously triggers the numeric keys "5", "6" and "7", which have key identifier 5, key identifier 6 and key identifier 7 respectively, on the remote controlling device within a predefined period. The remote controlling device can sequentially send key information respectively including the key identifier 5, 6 and 7 to the key service module through the operating system or the bottom layer of the smart TV. The key service module in the smart TV can determine that the order of the key identifier in key information sequentially received within the predefined period is key identifier 5, key identifier 6, and key identifier 7.

For another example, the user simultaneously triggers the numeric keys "5", "6", "7" and "8", which have key identifier 5, 6, 7 and 8 respectively, on the remote controlling device. The remote controlling device can sequentially send key information respectively including the key identifier 5, 6, 7 and 8 to the key service module through the operating system or the bottom layer of the smart TV. If the key service module in the smart TV finds out that the time the key information of key identifier 8 received falls out of the predefined period, the key service module can determine that the order of the key identifiers in each of the key information sequentially received within the predefined period is key identifier 5, key identifier 6, and the key identifier 7.

S1032d: determine whether the ordered key identifiers can be matched to the key sequence.

Illustratively, the key service module of the smart TV pre-stores key sequences for each UI, and each key sequence includes at least two ordered key identifiers. Thus, the key service module can determine whether any of the key sequences for the currently running UI matches the order of the key identifiers.

For example, the key service module stores key sequences for the currently running UI, where the first key sequence includes key identifiers 5, 6 and 7 arranged in a sequential order, the second key sequence includes key identifiers 7, 8 and 9 arranged in a sequential order, and the third key sequence includes key identifiers 1, 2, 3 and 4 arranged in a sequential order.

S1033d: if a match is found, generate the controlling instruction according to the responding policy for the key sequence that matches the ordered key identifiers.

Illustratively, since the key service module stores a responding policy for the key sequences of the currently running UI, if the key service module discovers that a key sequence matching the order of the key identifiers is included in the key sequences of the currently running UI, the key service module can generate a controlling instruction according to the responding policy for the key sequence which matches the ordered key identifiers.

For example, the key service module in the smart TV can determine that the order of the key identifier in key information sequentially received within the predefined period is key identifier 5, key identifier 6, and key identifier 7. The key service module stores key sequences for the currently running UI, where the first key sequence includes key identifiers 5, 6 and 7 arranged in a sequential order, the second key sequence includes key identifiers 7, 8 and 9 arranged in a sequential order, and the third key sequence includes key identifiers 1, 2, 3 and 4 arranged in a sequential order. The key service module can find out that the first key sequence can be matched to the ordered key identifiers received sequentially in each of the key information, i.e. key identifier 5, key identifier 6 and key identifier 7. Thus, the key service module can generate a controlling instruction according to the responding policy for the first key sequence. For example, the "key identifier 5, key identifier 6, key identifier 7" sequence is associated with the operations for jumping to the last multimedia file in the currently running UI.

Figure 6:
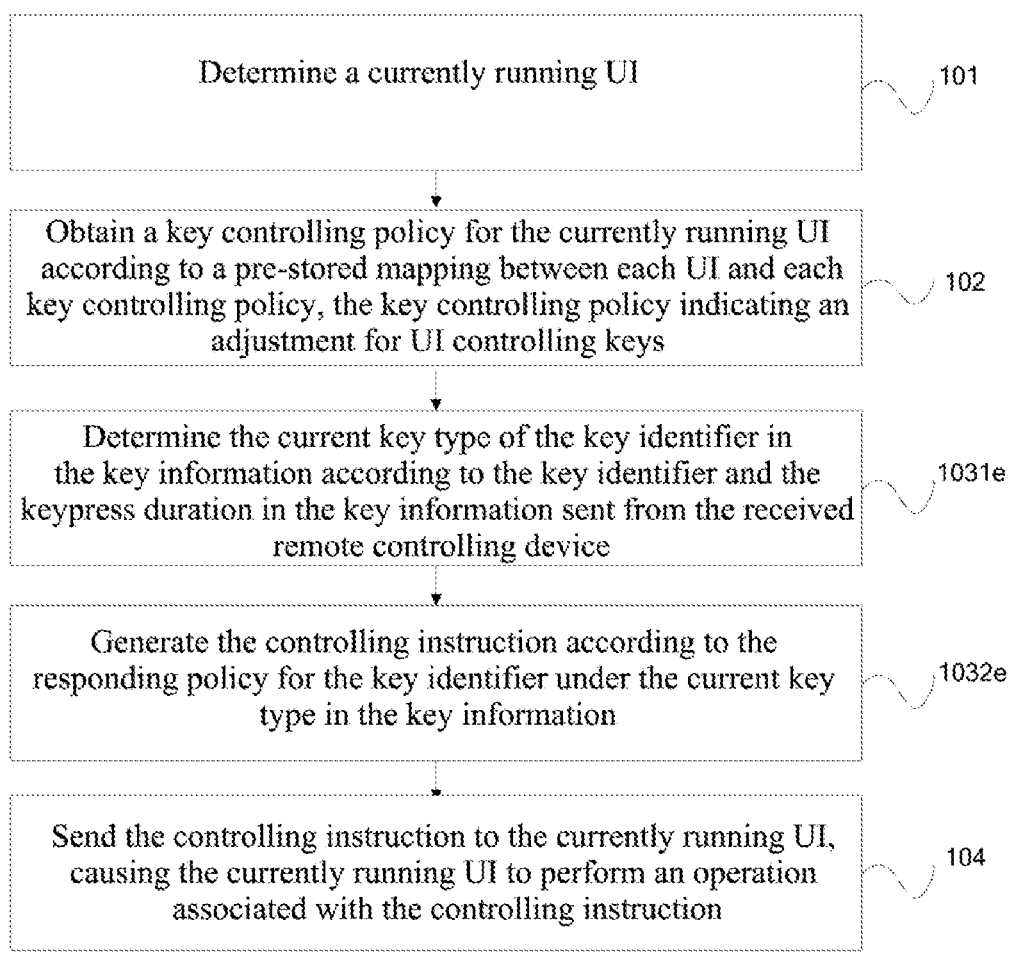
FIG. 6 is a flowchart illustrating a smart TV controlling method provided in some embodiments of this application.

FIG. 6 is a flowchart illustrating a smart TV controlling method provided in some embodiments of this application. As shown in FIG. 6, an implementation is provided, where the key information includes: a key identifier; and keypress duration. The key controlling policy for the currently running UI includes: the responding policy for key identifiers under key types, where the key type includes: a short key type; a long key type; a double-click key type; an inertia key type; a rapid key type; and a slow key type.

In this case, S103 may include:

S1031e: determine the current key type of the key identifier in the key information according to the key identifier and the keypress duration in the key information sent from the received remote controlling device.

Illustratively, the key controlling policy for the currently running UI obtained in S102 includes the responding policy for key identifiers under key types, where the key type includes: a short key type; a long key type; a double-click key type; an inertia key type; a rapid key type; and a slow key type. The key information received in S103 includes a key identifier and keypress duration.

The user triggers the keys on the remote controlling device as needed, due to different user habits and other characteristics, the triggering duration will differ for different users, which enables the key to be characterized by keypress duration. The remote controlling device sends the key information including the key identifier and keypress duration to the key service module in the smart TV through the operating system or the bottom layer of the smart TV. The key service module can determine the current key type of the current key triggering event for the currently running UI according to the key identifier and the keypress duration.

The key type may include: a short key type; a long key type; a double-click key type; an inertia key type; a rapid key type; and a slow key type.

For example, if the key service module determines that, for the currently running UI, the duration is short when the user triggers the key according to the keypress duration in the key information, it can be determined that the current key type of the key identifier in the key information is of the short key type. If the key service module determines that, for the currently running UI, the duration is long when the user triggers the key according to the keypress duration in the key information, it can be determined that the current key type of the key identifier in the key information is of the long key type. If the key service module determines that, for the currently running UI, the user triggers the same key within a certain period according to the keypress duration in two ordered key information, it can be determined that the current key type of the key identifiers in the key information is the double-click key type. As a possible implementation, the key service module can further determine that the user repeatedly triggers the same key within a certain period if it is find out that the interval at which the user triggers the same key is long. If the key service module determines that, for the currently running UI, the user repeatedly triggers the same key within a certain period according to the keypress duration in a plurality of ordered key information, it can be determined that the current key type of the key identifiers in the key information is the inertia key type. If the key service module determines that for the currently running UI, the interval between the triggering of two keys by the user successively is relatively short according to the keypress duration in the two ordered key information, it can be determined that the current key type of the key identifier in the key information is the rapid key type. If the key service module determines that for the currently running UI, the interval between the triggering of two keys by the user successively is relatively long according to the keypress duration in the two ordered key information, it can be determined that the current key type of the key identifier in the key information is the slow key type.

S1032e: generate the controlling instruction according to the responding policy for the key identifier under the current key type in the key information.

Illustratively, the key service module of the smart TV stores, for each UI, the responding policy for the key identifiers under each key type. Thus, after determining the current key type of the key identifier in the key information, the key service module can generate the controlling instruction according to the responding policy for the key identifier in the key information under the current key type.

In the embodiment of the present application, the responding policy for the key identifier under the long key type includes the response frequency of the key identifier under the long key type. Thus, having determined that the current key type of the key identifier in the key information is the long key type, the key service module can determine the number of controlling instructions to be generated according to the product of the keypress duration and the response frequency in the key identifier. Then, the key service module generates a plurality of controlling instructions according to the key identifier in the key information and the determined response frequency.

For example, different UIs have different responding policies for keypress events of the long key type, and thus have different segmentations for the keypress duration of the long key type. As the key triggers Keypress value, the currently running UI needs to segment the keypress duration of the long key type in the manner of x1, i.e. the Keypress value is sent once every x1 period. Or, the currently running UI needs to segment the keypress duration of the long key type in the manner of x2, i.e. the Keypress value is sent once every x2 period. Thus, controlling instructions can be generated to control the currently running UI to scroll the channel list module, or the currently running UI can be set by the user to perform time switching for the frequency channel.

Figure 7:
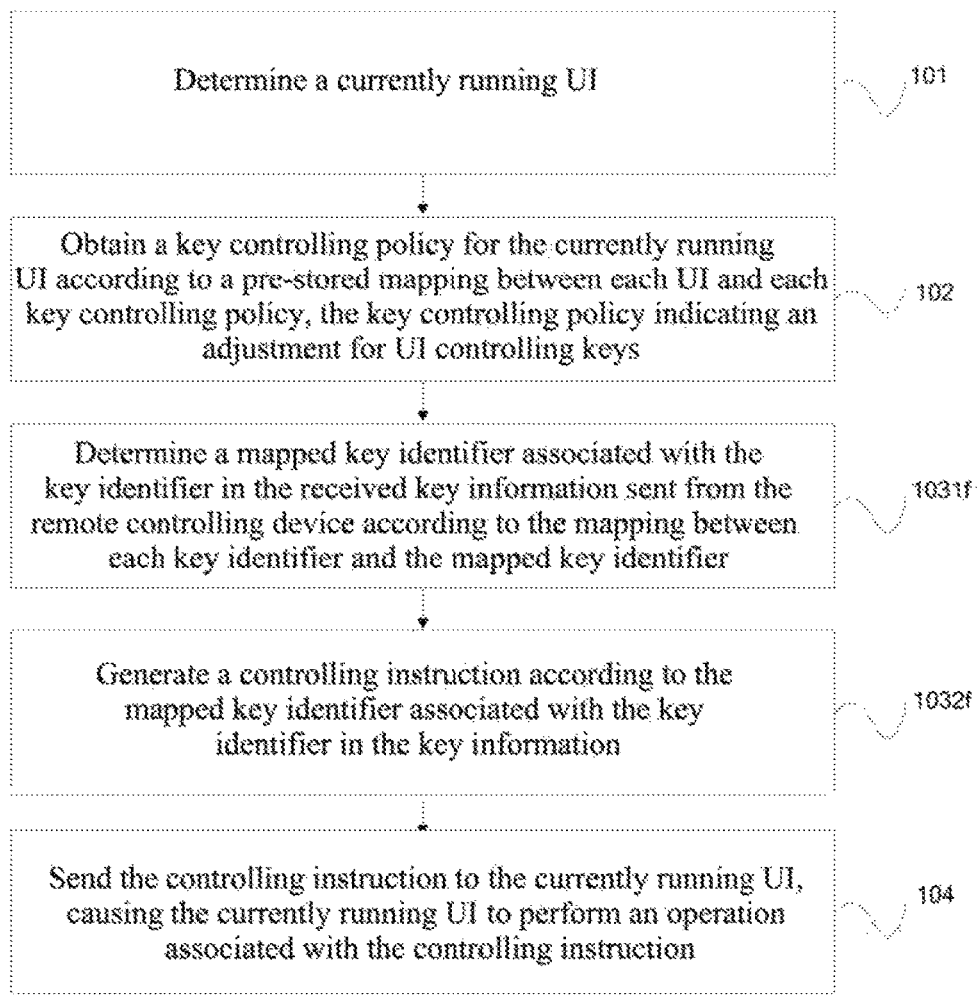
FIG. 7 is a flowchart illustrating a smart TV controlling method provided in some embodiments of this application.

FIG. 7 is a flowchart illustrating a smart TV controlling method provided in some embodiments of this application.

As shown in FIG. 7, an implementation is provided, where the key information includes: a key identifier. A key controlling policy for a currently running UI includes a mapping between each key identifier and a mapped key identifier.

In this case, S103 may include:

S1031f: determine a mapped key identifier associated with the key identifier in the received key information sent from the remote controlling device according to the mapping between each key identifier and the mapped key identifier.

Illustratively, the key controlling policy for the currently running UI obtained in S102 includes a mapping of the key identifiers, where the mapping indicates the mapping between a key identifier and a mapped key identifier. The key information received in S103 includes a key identifier.

The user triggers a key on the remote controlling device as needed, so that the remote controlling device sends key information including the key identifiers to the key service module through the operating system or bottom layer of the smart TV. The key service module pre-stores the mappings between the key identifiers and each of the UIs, so that after the key service module determines the mapping between a key identifier and a currently running UI, the key service module can query about the mapped key identifier associated with the key identifier in the current key information in mapping between the key identifiers and the currently running UI.

For example, the user triggers a numeric key "9" on the remote controlling device, and the key service module receives a key identifier 9 sent from the remote controlling device through the operating system or bottom layer of the smart TV. For the currently running UI, the key identifier 9 corresponds to a key identifier F, hence the key service module can determine that the key identifier F is associated with the key identifier 9.

S1032f: generate a controlling instruction according to the mapped key identifier associated with the key identifier in the key information.

Illustratively, after the key service module discovering the mapped key identifier associated with the key identifier in the current key information, a controlling instruction can be generated according to the mapped key identifier associated with the key identifier in the key information.

For example, the user triggers a numeric key "9" on the remote controlling device, and the key service module receives a key identifier 9 sent from the remote controlling device through the operating system or bottom layer of the smart TV. For the currently running UI, the key identifier 9 corresponds to a key identifier F, hence the key service module can determine that the key identifier F is associated with the key identifier 9. Then, the key identifier 9 is associated with a keypress value, while the key identifier F is associated with a keyup value. Hence, the key service module can determine the keyup value, thus generates a controlling instruction according to the keyup value.

Figure 8:
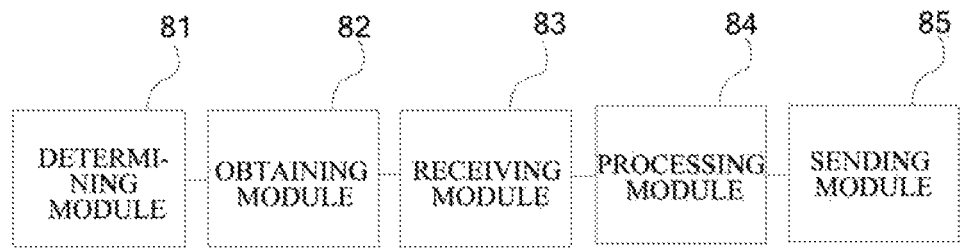
FIG. 8 is a schematic structural view illustrating a smart TV provided in some embodiments of the present application.

FIG. 8 is a schematic structural view illustrating a smart TV provided in some embodiments of the present application. As illustrated in FIG. 8, the smart TV includes:

a determining module 81, configured to determine a currently running UI;

an obtaining module 82, configured to obtain a key controlling policy associated with the currently running UI according to a pre-stored mapping between each UI and each key controlling policy, the key controlling policy indicating an adjustment for UI controlling keys;

a receiving module 83, configured to receive key information sent from a remote controlling device;

a processing module 84, configured to process the key information according to the key controlling policy associated with the currently running UI to generate a controlling instruction; and a sending module 85, configured to send the controlling instruction to the currently running UI, so that the currently running UI performs an operation associated with the controlling instruction.

The smart TV of the embodiment of the present application is capable of performing a smart TV controlling method provided in the above described embodiments of this application, following similar principals which will not be repeated herein.

Figure 9:
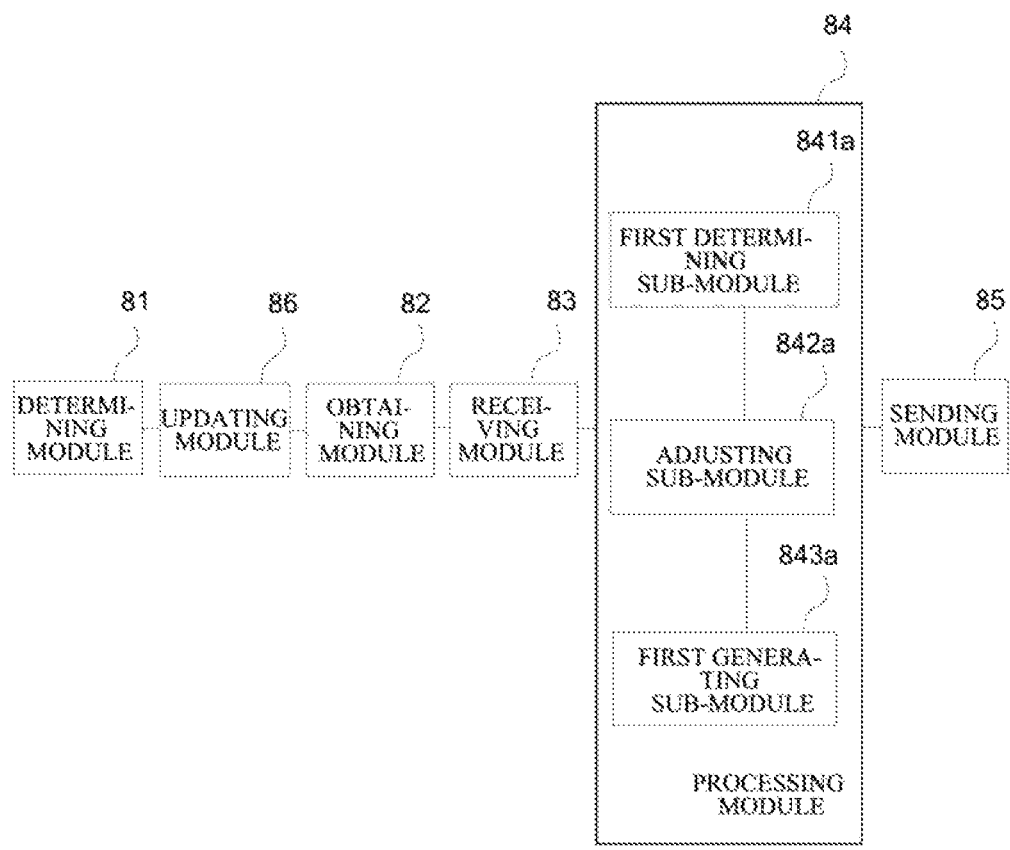
FIG. 9 is a schematic structural view illustrating a smart TV provided in some embodiments of the present application.

FIG. 9 is a schematic structural view illustrating a smart TV provided in some embodiments of the present application. As illustrated in FIG. 9, the smart TV provided in embodiments of the present application may further include:

an updating module 86, configured to: receive an updating instruction before the obtaining module 82 obtaining the key controlling policy associated with the currently running UI according to a pre-stored mapping between each UI and each key controlling policy, where the updating instruction includes an updated key controlling policy for each UI; and store the updated key controlling policy for each UI.

The key information includes: a key identifier; the key controlling policy for the currently running UI includes: a responding policy for responding intervals associated with each key identifier; and thus a processing module 84 includes:

a first determining sub-module 841a, configured to determine the key responding interval associated with the received key identifier in the key information sent from the remote controlling device;

an adjusting sub-module 842a, configured to adjust the responding interval according to the responding policy for the responding interval associated with the key identifier in the key information to generate an adjusted key responding interval; and a first generating sub-module 843a, configured to generate the controlling instruction according to the adjusted key responding interval.

The smart TV of the embodiment of the present application is capable of performing a smart TV controlling method provided in the above described embodiments of this application, following similar principals which will not be repeated herein.

Figure 10:
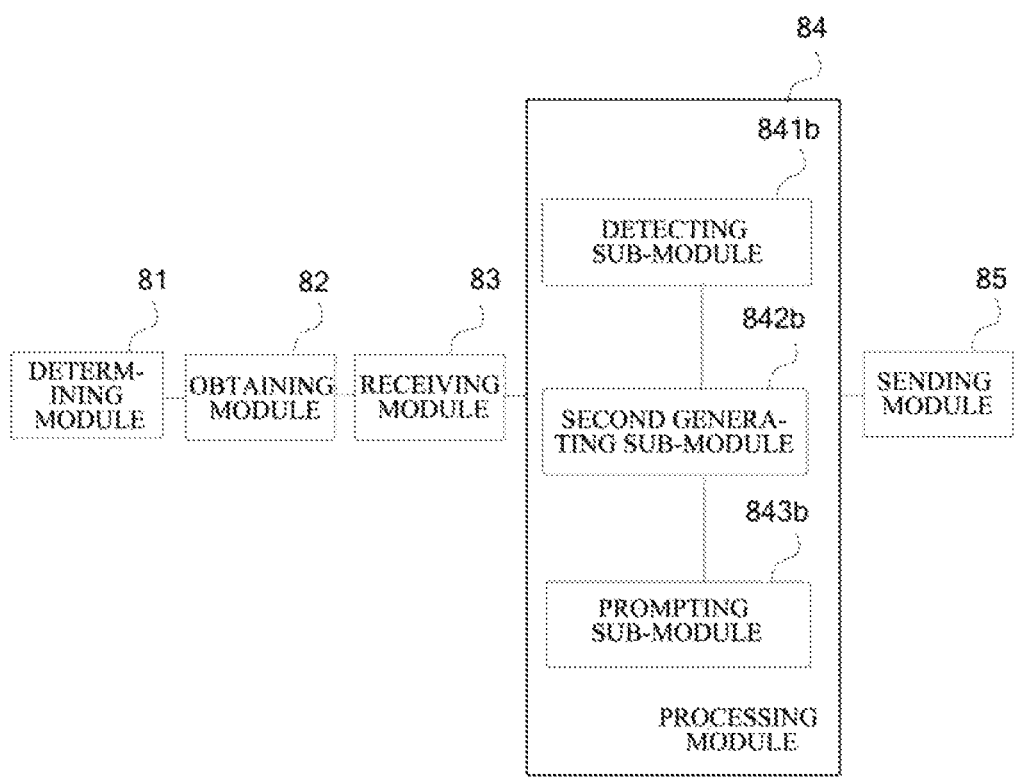
FIG. 10 is a schematic structural view illustrating a smart TV provided in some embodiments of the present application.

FIG. 10 is a schematic structural view illustrating a smart TV provided in some embodiments of the present application. As shown in FIG. 10, the key information includes: a key identifier. The key controlling policy for the currently running UI includes: a valid key set. The valid key set includes the key identifier for at least one valid key. Accordingly, the processing module 84 of the smart TV provided in the embodiment of the present application may include:

a detecting sub-module 841b, configured to detect whether the key identifier in the received key information sent from the remote controlling device is presented in the valid key set;

a second generating sub-module 842b, configured to, if the key identifier is presented, generating the controlling instruction according to the key identifier in the key information; and a prompting sub-module 843b, configured to, if the key identifier is not presented, generate prompting information to prompt the user to resend the key information through the remote controlling device.

The smart TV of the embodiment of the present application is capable of performing a smart TV controlling method provided in the above described embodiments of this application, following similar principals which will not be repeated herein.

Figure 11:
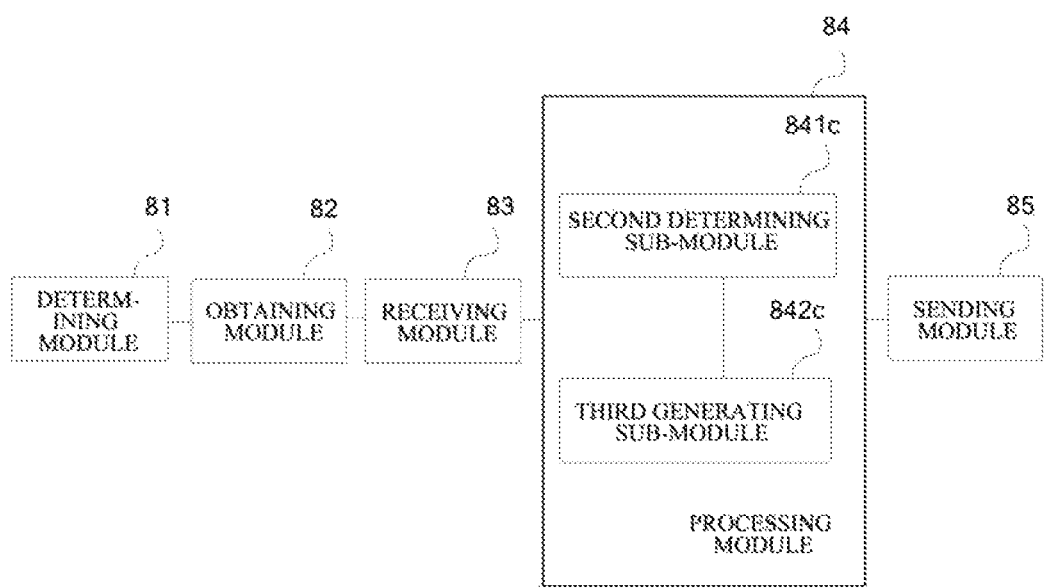
FIG. 11 is a schematic structural view illustrating a smart TV provided in some embodiments of the present application.

FIG. 11 is a schematic structural view illustrating a smart TV provided in some embodiments of the present application. As shown in FIG. 11, the key information includes: at least two key identifiers. The key controlling policy for the currently running UI includes: a responding policy for a key combination. In this case, the key combination includes at least two key identifiers. The processing module 84 of the smart TV provided in the embodiment of the present application may include:

a second determining sub-module 841c, configured to determine whether key identifiers in the key information sent from the remote controlling device can be matched to the key combination.

a third generating sub-module 842c, configured to, if a key combination match is found, generate the controlling instruction according to the responding policy for the key combination that matches the key identifiers in the key information.

The smart TV of the embodiment of the present application is capable of performing a smart TV controlling method provided in the above described embodiments of this application, following similar principals which will not be repeated herein.

Figure 12:
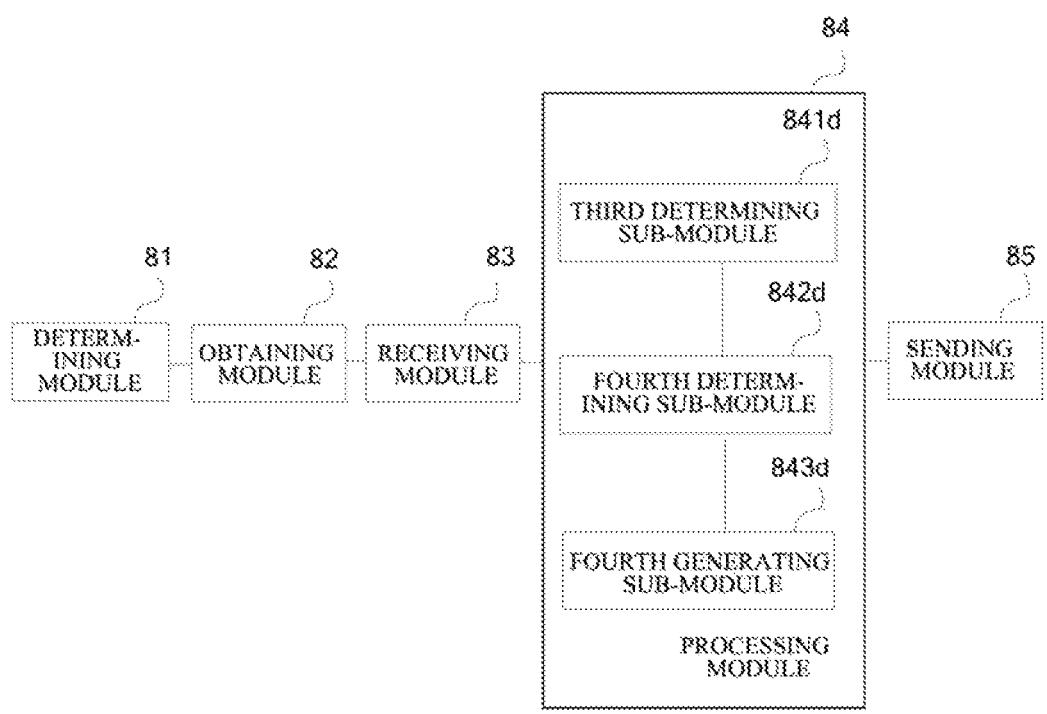
FIG. 12 is a schematic structural view illustrating a smart TV provided in some embodiments of the present application.

FIG. 12 is a schematic structural view illustrating a smart TV provided in some embodiments of the present application. As shown in FIG. 12, the key information includes: a key identifier. The key controlling policy for the currently running UI includes: a responding policy for a key sequence. In this case, the key sequence includes at least two key identifiers following a sequential order. The processing module 84 of the smart TV provided in the embodiment of the present application may include:

a third determining sub-module 841d, configured to determine an order of individual key identifiers in each of the key information sequentially received in a predefined period;

a fourth determining sub-module 842d, configured to determine whether the ordered key identifiers can be matched to the key sequence; and a fourth generating sub-module 843d, configured to, if a key sequence match is found, generate the controlling instruction according to the responding policy for the key sequence that matches the ordered key identifiers.

The smart TV of the embodiment of the present application is capable of performing a smart TV controlling method provided in the above described embodiments of this application, following similar principals which will not be repeated herein.

Figure 13:
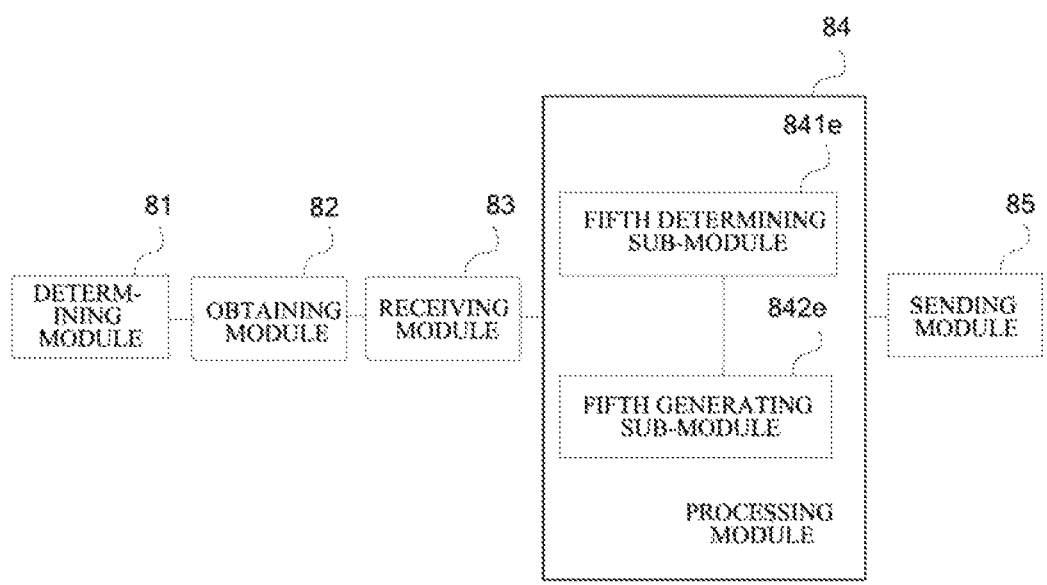
FIG. 13 is a schematic structural view illustrating a smart TV provided in some embodiments of the present application.

FIG. 13 is a schematic structural view illustrating a smart TV provided in some embodiments of the present application. As shown in FIG. 13, the key information includes: a key identifier and keypress duration. The key controlling policy for the currently running UI includes: the responding policy for key identifiers under key types, where the key type includes: a short key type; a long key type; a double-click key type; an inertia key type; a rapid key type; and a slow key type. The processing module 84 of the smart TV provided in the embodiment of the present application may include:

a fifth determining sub-module 841e, configured to determine the current key type of the key identifier in the key information according to the key identifier and the keypress duration in the key information sent from the received remote controlling device; and a fifth generating sub-module 842e, configured to generate the controlling instruction according to the responding policy for the key identifier under the current key type in the key information.

A responding policy for a key identifier under a long key type includes: a response frequency of the key identifier under the long key type. Accordingly, the fifth generation sub-module 842e is configured to:

generate at least one controlling instruction according to the key identifier in the key information and the response frequency of the key identifier under the current key type, where the number of the at least one controlling instruction is a product of the keypress duration and the response frequency in the key information.

The smart TV of the embodiment of the present application is capable of performing a smart TV controlling method provided in the above described embodiments of this application, following similar principals which will not be repeated herein.

Figure 14:
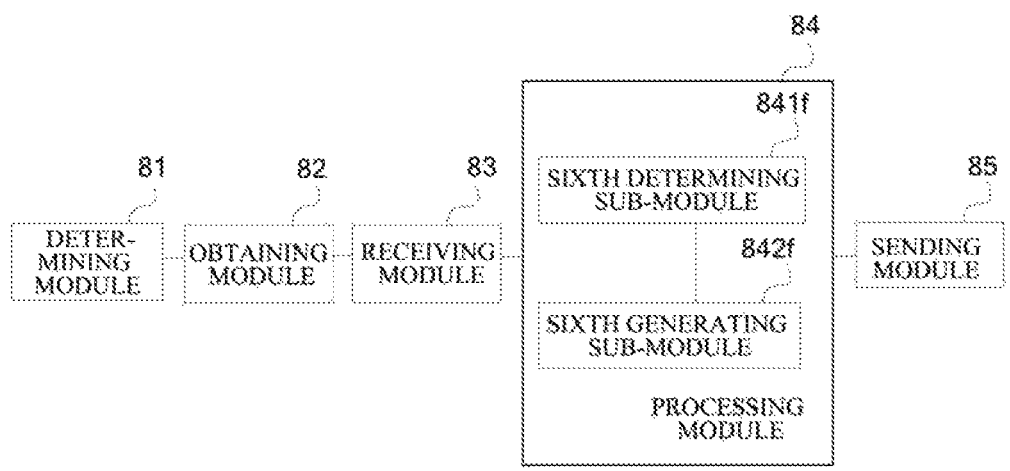
FIG. 14 is a schematic structural view illustrating a smart TV provided in some embodiments of the present application.

FIG. 14 is a schematic structural view illustrating a smart TV provided in some embodiments of the present application. As shown in FIG. 14, the key information includes: a key identifier. A key controlling policy for a currently running UI includes a mapping between each key identifier and a mapped key identifier. The processing module 84 of the smart TV provided in the embodiment of the present application may include:

a sixth determining sub-module 841f, configured to determine a mapped key identifier associated with the key identifier in the received key information sent from the remote controlling device according to the mapping between each key identifier and the mapped key identifier; and a sixth generating sub-module 842f, configured to generate a controlling instruction according to the mapped key identifier associated with the key identifier in the key information.

The smart TV of the embodiment of the present application is capable of performing a smart TV controlling method provided in the above described embodiments of this application, following similar principals which will not be repeated herein.

The present application further provides a smart TV, including: a memory storing instructions; a processor coupled with the memory and configured to execute the instructions stored in the memory, and the processor is configured to:

determine a currently running UI; obtain a key controlling policy for the currently running UI according to a pre-stored mapping between each UI and each key controlling policy, the key controlling policy indicating an adjustment for UI controlling keys; generate a controlling instruction according to received key information sent from a remote controlling device and the key controlling policy for the currently running UI; and send the controlling instruction to the currently running UI to enable the currently running UI to perform an operation associated with the controlling instruction.

The processor in the smart TV of the embodiments of this application may be further configured to perform any of the methods for smart TV controlling method provided in the foregoing embodiments of the present application, following similar implementation principals which will not be repeated herein.

It will be apparent to those of ordinary skill in the art that, for the convenience and conciseness of the descriptions, the particular operation process of the aforementioned smart TV can be understood by referring to corresponding processes in the foregoing method embodiments, which will not be repeated herein.

Persons of ordinary skill in the art may understand that, all or a part of steps of the foregoing method embodiments may be implemented by a program instructing relevant hardware. The foregoing program may be stored in a computer readable storage medium. When the program runs, the steps of the foregoing embodiment methods are performed. The foregoing storage medium includes various mediums capable of storing program codes, such as a ROM, a RAM, a magnetic disk, or an optical disc.

Finally, it should be noted that the foregoing embodiments are merely intended for describing the technical solutions of the present application rather than limiting the present application. Although the present application is described in detail with reference to the foregoing embodiments, persons of ordinary skill in the art should understand that they may still make modifications to the technical solutions described in the foregoing embodiments, or make equivalent replacements to some or all technical features therein; however, these modifications or replacements do not make the essence of corresponding technical solutions depart from the scope of the technical solutions in the embodiments of the present application.

What is claimed is:

1. A smart television (TV) controlling method, comprising:
    providing a first user interface (UI) and a second UI on the smart TV;
    maintaining a first set of key response rules specifying a first maximum inter-key time interval for recognizing and including key presses, in the first UI, corresponding to a sequence of activation of a first plurality of control keys on a remote control device for the smart TV as a first combinational key event;
    maintaining a second set of key response rules specifying a second maximum inter-key time interval for recognizing and including key presses, in the second UI, corresponding to a sequence of activation of a second plurality of control keys on the remote control device as a second combinational key event;
    recognizing the first combinational key event in the first UI when a time separation between sequentially received activation of the first plurality of control keys from the remote control device corresponding to the first combinational key event is not more than the first maximum inter-key time interval;
    recognizing the second combinational key event in the second UI when a time separation between sequentially received activations of the second plurality of control keys from the remote control device corresponding to the second combinational key event is not more than the second maximum inter-key time interval;
    upon recognizing the first combinational key event, generating a first control instruction corresponding to the first combinational key event to enable the first UI to perform an operation associated with the first control instruction; and
    upon recognizing the second combinational key event, generating a second control instruction corresponding to the second combinational key event to enable the second UI to perform an operation associated with the second control instruction,
    wherein inter-key time interval represents a time period between two consecutive key activations, and wherein the first maximum inter-key time interval and the second maximum inter-key time interval are independently configurable to distinct time periods in the smart TV for each of the first UI and the second UI.

2. The method according to claim 1, further comprising providing a setting interface on the smart TV for reconfiguring the first maximum inter-key time interval and the second maximum inter-key time interval.

3. The method according to claim 1, wherein the first set of key response rules further specify a third maximum inter-key time interval for recognizing, in the first UI, a third combinational key event, and wherein the third maximum inter-key time interval is reconfigurable in the smart TV independent of the first maximum inter-key time interval and second maximum inter-key time interval.

4. The method according to claim 1, wherein the first set of key response rules further specify a third maximum inter-key time interval for recognizing, in the first UI, a third combinational key event, and wherein the third maximum inter-key time interval is reconfigurable in the smart TV independent of the first maximum inter-key time interval and the second maximum inter-key time interval.

5. The method according to claim 1, wherein the first combinational key event and the second combinational key event are identical while the first control instruction and the second control instruction enable distinct types of operation in the first UI and the second UI.

6. A smart television (TV) controlling method, comprising:
    providing a first user interface (UI) and a second UI;
    maintaining a first set of key response rules comprising a first timing-sequence for generating control instructions in the first UI when responding to a single continuous long-press activation of a first control key among a plurality of control keys on a remote control device of the smart TV;
    maintaining a second set of key response rules comprising a second timing-sequence for generating control instructions in the second UI when responding to a single continuous long-press activation of a second control key among the plurality of control keys on the remote control device of the smart TV;
    upon receiving a single continuous long-press key activation signal of the first control key from the remote control device when the smart TV is in the first UI, generating a first series of a first control instruction according to the first timing-sequence during the single continuous long-press key activation signal of the first control key to enable the first UI to perform a series of operations associated with the first control instruction;
    upon receiving a single continuous long-press key activation signal of the second control key from the remote control device when the smart TV is in the second UI, generating a second series of a second control instruction according to the second timing-sequence during the single continuous long-press key activation signal of the second control key to enable the second UI to perform a series of operations associated with the second control instruction;
    wherein the first timing-sequence and the second timing-sequence are independently reconfigurable to distinct time-sequences in the smart TV for the first UI and the second UI.

7. The method according to claim 6, further comprising reconfiguring the first timing-sequence and the second timing-sequence in the smart TV based on reconfiguring an inactive time interval for the first control key and the second control key, respectively.

8. The method according to claim 6, wherein the first control key is one of a volume-adjustment key and a channel-scrolling key on the remote control device for the smart TV.

9. The method according to claim 6, wherein the first timing-sequence corresponds to a first control frequency for repeatedly transmitting control instructions during the single continuous long-press activation of the first control key.

10. The method according to claim 6, wherein the first timing-sequence corresponds to an accelerating timing-sequence such that first series of the first control instruction is generated with decreasing time intervals.

11. The method according to claim 6, wherein the first set of key response rules further specify a third timing-sequence for generating control instructions in the first UI when responding to a single continuous long-press activation of a third control key among the plurality of control keys on the remote control device, and wherein the third timing-sequence is reconfigurable in the smart TV independent of the first timing-sequence and the second timing-sequence.

12. The method according to claim 6, wherein the first control key of the remote control device is the same as the second control key, and wherein the first control instruction and the second control instruction enables distinct types of operation in the first UI and the second UI.

13. A smart television (TV), comprising, a memory storing instructions, a processor coupled with the memory, wherein the processor, when executing the instructions, is configured to:
provide a first user interface (UI) and a second UI on the smart TV;
maintain a first set of key response rules specifying a first key inactive time interval for responding to activation of keys on a remote control device of the smart TV;
maintain a second set of key response rules specifying a second key inactive time interval for responding to activation of keys on the remote control device;
upon receiving a first key activation signal from the remote control device in the first UI:
generate a first control instruction and sending the first control instruction to the first UI to enable the first UI to perform an operation associated with the first control instruction; and
render the first UI irresponsive to further key activation signal for a time period determined by the first key inactive time interval; and
upon receiving a second key activation signal from the remote control device in the second UI:
generate a second control instruction and sending the second control instruction to the second UI to enable the second UI to perform an operation associated with the second control instruction; and
render the second UI irresponsive to further key activation signal for a time period determined by the second key inactive time interval,
wherein key inactive time interval represents a time period after a key press during which the smart TV ignores a next key press, and wherein the first key inactive time interval and the second key inactive time interval are independently reconfigurable to distinct time periods in the smart TV for the first UI and the second UI.

14. The smart TV of claim 13, wherein the processor, when executing the instructions, is further configured to provide a setting interface on the smart TV for reconfiguring the first key inactive time interval and the second key inactive time interval.

* * * * *